(12) United States Patent
Smith et al.

(10) Patent No.: US 9,676,361 B2
(45) Date of Patent: Jun. 13, 2017

(54) FRONTAL AIRBAG ASSEMBLIES

(71) Applicant: Autoliv ASP, Inc., Ogden, UT (US)

(72) Inventors: Bradley W. Smith, Plain City, UT (US); Donald James Paxton, Romeo, MI (US); Stephen Charles Camm, Port Huron, MI (US); Richard Lawrence Matsu, Plymouth, MI (US)

(73) Assignee: Autoliv ASP, Inc. UT (US)

( * ) Notice: Subject to any disclaimer, the term of this patent is extended or adjusted under 35 U.S.C. 154(b) by 11 days.

(21) Appl. No.: 14/695,993

(22) Filed: Apr. 24, 2015

(65) Prior Publication Data

US 2016/0311393 A1    Oct. 27, 2016

(51) Int. Cl.
| | |
|---|---|
| *B60R 21/232* | (2011.01) |
| *B60R 21/2338* | (2011.01) |
| *B60R 21/213* | (2011.01) |
| *B60R 21/214* | (2011.01) |
| *B60R 21/231* | (2011.01) |

(52) U.S. Cl.
CPC .......... *B60R 21/232* (2013.01); *B60R 21/213* (2013.01); *B60R 21/214* (2013.01); *B60R 21/231* (2013.01); *B60R 2021/23107* (2013.01); *B60R 2021/23386* (2013.01)

(58) Field of Classification Search
CPC ................ B60R 21/232; B60R 21/233; B60R 2021/23129
See application file for complete search history.

(56) References Cited

U.S. PATENT DOCUMENTS

| | | | | |
|---|---|---|---|---|
| 3,774,936 A | * | 11/1973 | Barnett ................ | B60R 21/214 280/730.1 |
| 3,930,664 A | * | 1/1976 | Parr ...................... | B60R 21/08 180/90 |
| 4,536,008 A | * | 8/1985 | Brown, Jr. ............ | B60R 21/213 280/730.1 |
| 5,470,103 A | | 11/1995 | Gridley et al. | |
| 5,602,734 A | * | 2/1997 | Kithil ................... | B60N 2/002 180/282 |

(Continued)

FOREIGN PATENT DOCUMENTS

| | | |
|---|---|---|
| DE | 19841347 A1 | 3/2000 |
| DE | 19859988 A1 | 6/2000 |

(Continued)

*Primary Examiner* — Barry Gooden, Jr.
(74) *Attorney, Agent, or Firm* — Stoel Rives LLP

(57) ABSTRACT

Airbag assemblies are disclosed that comprise a frontal inflatable cushion that can deploy from a housing assembly to receive a head and/or a portion of a torso of a vehicle occupant moving from a vehicle occupant position in a forward direction relative to the vehicle during a vehicle impact event. The frontal inflatable cushion can be a curtain airbag. The frontal inflatable cushion can also be coupled to one or more support components within a passenger compartment of the vehicle, such that when the frontal inflatable cushion is in the deployed state the one or more support components support the frontal inflatable cushion in a rearward direction, relative to the vehicle, to enable the frontal inflatable cushion to restrain movement of the vehicle occupant in the forward direction during a vehicle impact event. The support components may include a side inflatable cushion, such as a curtain airbag.

17 Claims, 10 Drawing Sheets

(56) References Cited

U.S. PATENT DOCUMENTS

| | | | |
|---|---|---|---|
| 5,988,735 A * | 11/1999 | Muller | B60R 13/0225 280/728.2 |
| 6,070,902 A * | 6/2000 | Kowalski | B60R 13/0225 280/730.2 |
| 6,237,938 B1 | 5/2001 | Boxey | |
| 6,312,009 B1 * | 11/2001 | Håland | B60R 21/08 280/729 |
| 6,637,769 B2 | 10/2003 | Peer et al. | |
| 6,722,691 B1 * | 4/2004 | Håland | B60R 21/16 280/730.1 |
| 6,733,035 B2 | 5/2004 | Thomas et al. | |
| 7,661,701 B2 | 2/2010 | Hirata | |
| 7,762,579 B2 | 7/2010 | Garner | |
| 7,806,432 B2 * | 10/2010 | Nelson | B60R 21/232 280/730.2 |
| 8,235,418 B2 | 8/2012 | Slaats et al. | |
| 8,602,448 B2 | 12/2013 | Choi et al. | |
| 2003/0052476 A1 | 3/2003 | Rose | |
| 2003/0111828 A1 * | 6/2003 | Dominissini | B60R 21/232 280/730.2 |
| 2003/0218319 A1 * | 11/2003 | Amamori | B60R 21/23 280/729 |
| 2004/0090050 A1 | 5/2004 | Dominissini | |
| 2004/0100073 A1 * | 5/2004 | Bakhsh | B60R 21/213 280/730.1 |
| 2004/0100074 A1 * | 5/2004 | Bakhsh | B60R 21/213 280/730.1 |
| 2004/0174003 A1 | 9/2004 | Dominissini | |
| 2004/0183282 A1 | 9/2004 | Schneider et al. | |
| 2004/0188991 A1 | 9/2004 | Schneider et al. | |
| 2004/0212185 A1 * | 10/2004 | Daines | B60R 21/232 280/743.2 |
| 2004/0232665 A1 * | 11/2004 | Bendig | B60R 21/232 280/730.2 |
| 2004/0239082 A1 | 12/2004 | Schneider et al. | |
| 2004/0251668 A1 | 12/2004 | Schneider et al. | |
| 2004/0256841 A1 * | 12/2004 | Bakhsh | B60R 21/02 280/730.1 |
| 2005/0001412 A1 | 1/2005 | Schneider et al. | |
| 2005/0040627 A1 | 2/2005 | Depottey et al. | |
| 2005/0040667 A1 | 2/2005 | Schneider et al. | |
| 2005/0062262 A1 | 3/2005 | Williams | |
| 2005/0070414 A1 | 3/2005 | Schneider et al. | |
| 2005/0073135 A1 | 4/2005 | Choi | |
| 2006/0214401 A1 * | 9/2006 | Hirata | B60R 21/232 280/730.1 |
| 2008/0238045 A1 * | 10/2008 | Garner | B60R 21/08 280/728.2 |
| 2009/0058054 A1 * | 3/2009 | Nelson | B60R 21/232 280/730.2 |
| 2009/0212537 A1 * | 8/2009 | Slaats | B60R 21/232 280/728.2 |
| 2009/0236832 A1 * | 9/2009 | Ilda | B60R 21/213 280/730.1 |

FOREIGN PATENT DOCUMENTS

| | | |
|---|---|---|
| DE | 10115064 A1 | 11/2002 |
| EP | 1541426 A1 | 6/2005 |
| EP | 1757494 A2 | 2/2007 |
| GB | 2345669 A | 7/2000 |
| GB | 2364674 A | 2/2002 |
| GB | 2378424 A | 2/2003 |
| GB | 2388080 A | 11/2003 |
| GB | 2388081 A | 11/2003 |
| KR | 20100039085 A | 4/2010 |
| KR | 20150027587 A | 3/2015 |
| WO | WO0041919 A1 | 7/2000 |
| WO | WO2008054266 A1 | 5/2008 |
| WO | WO2009102791 A1 | 8/2009 |
| WO | WO2010128762 A2 | 11/2010 |

* cited by examiner

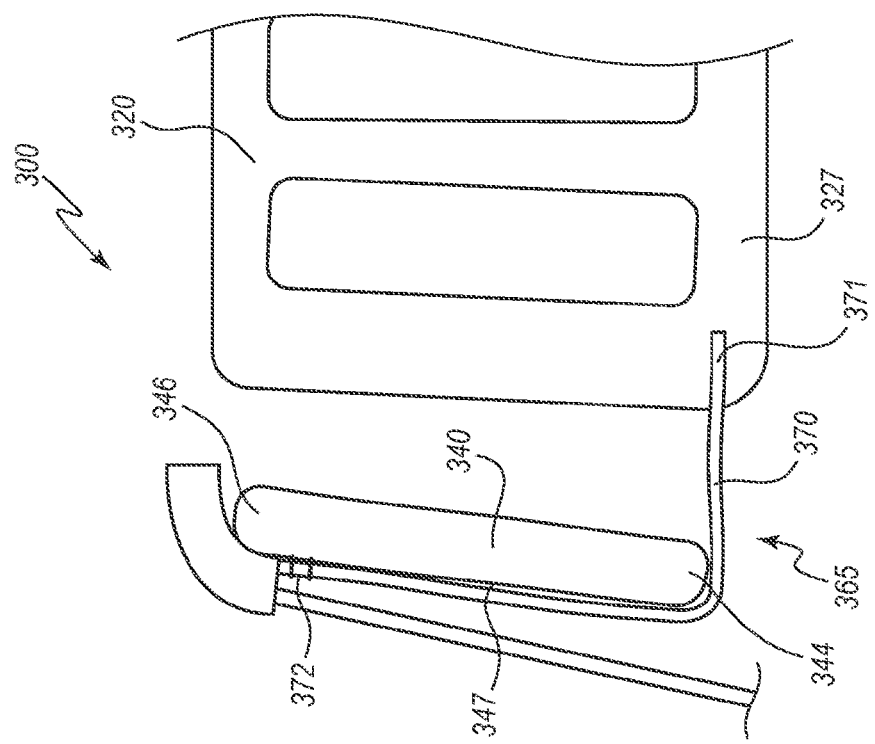
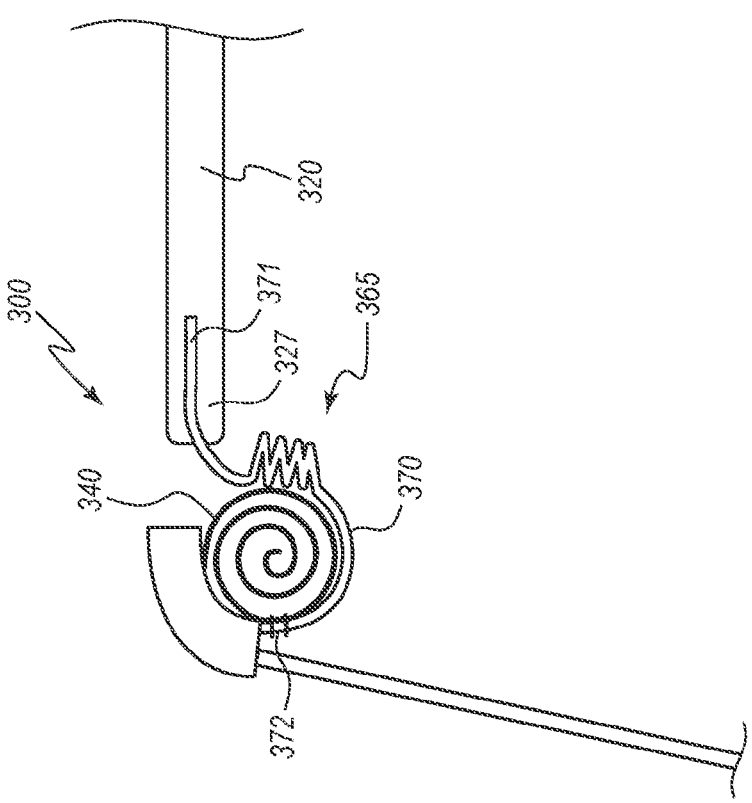
FIG. 7A
FIG. 7B

FRONTAL AIRBAG ASSEMBLIES

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 7A is a front view of a tether system according to another embodiment of the present disclosure, in a packaged state within a vehicle FIG. 7B is a front view of the tether system of FIG. 7A in a deployed state.

DETAILED DESCRIPTION

Figure 1A:
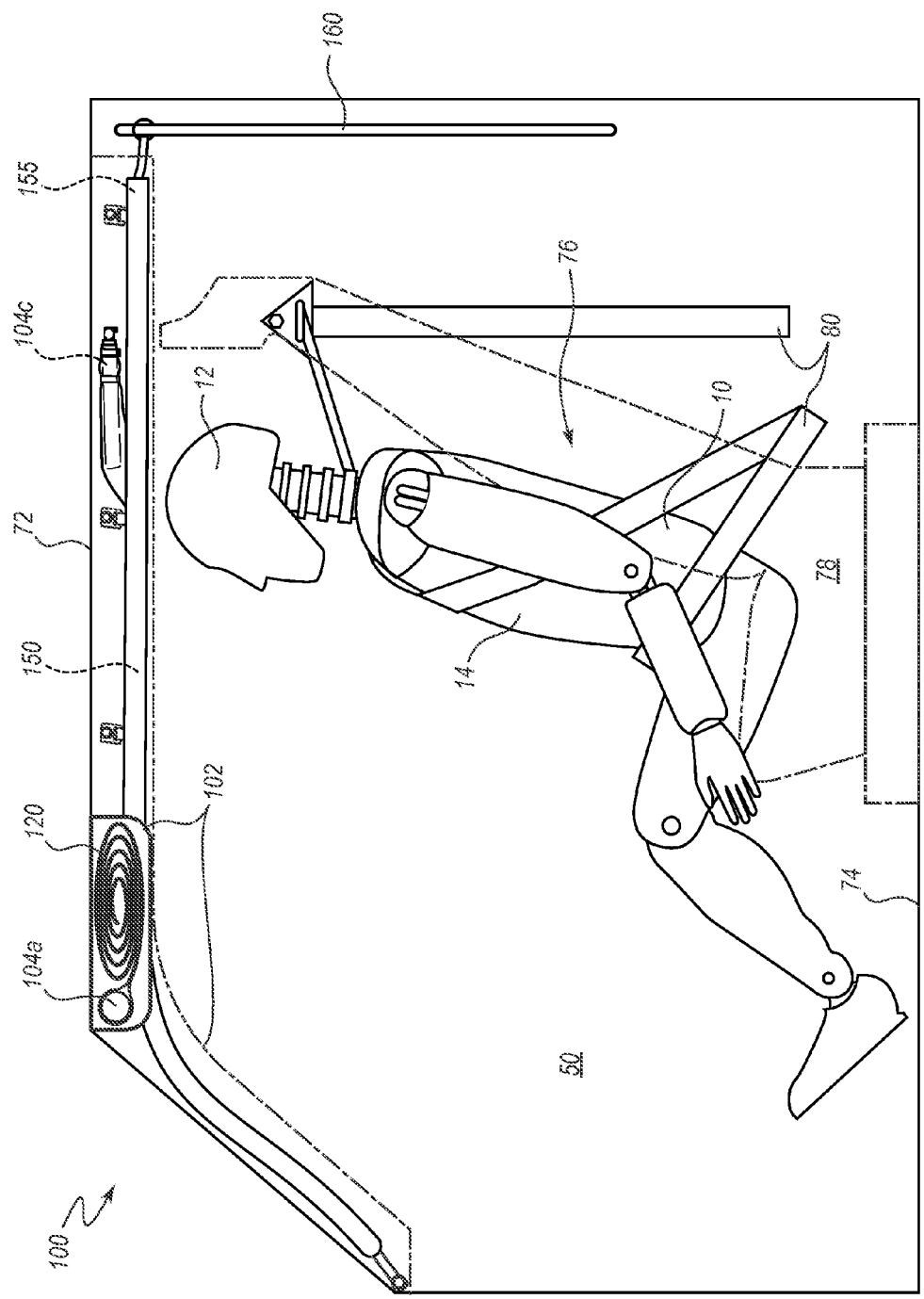
FIG. 1A is a side elevation view of an airbag assembly, according to one embodiment of the present disclosure, in a packaged state within a vehicle

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

As used herein, the term "occupant interfacing surface" refers to a surface or portion of a vehicle that may be engaged or struck by a vehicle occupant during a collision event. For example, in a frontal collision event the occupant interfacing surface of a vehicle driver may comprise at least the steering wheel and/or the dashboard.

Inflatable airbag systems are widely used to reduce or minimize vehicle occupant injury during collision events. Airbag modules have been installed at various locations within a vehicle, including, but not limited to, within the steering wheel, within the dashboard and/or instrument panel, within the side doors or side seats, adjacent to a roof rail of the vehicle, in an overhead position, or at the knee or leg position. In the following disclosure, "airbag" generally refers to an inflatable curtain airbag or cushion, although the principles discussed may apply to other types of airbags (e.g., driver airbags, knee airbags, and side airbags).

In certain embodiments, vehicles may comprise passenger compartments that are larger than passenger compartments of some other vehicles. A vehicle comprising a larger passenger compartment may provide additional (or more generous) leg room. As such, a vehicle comprising a larger passenger compartment may further provide a greater distance between a vehicle occupant and an occupant interfacing surface relative to a vehicle comprising a smaller passenger compartment. The greater distance between the vehicle occupant and the occupant interfacing surface in the larger passenger compartment may require the use of a larger airbag, relative to an airbag used in a vehicle having a smaller passenger compartment, to fill the gap or the space between the vehicle occupant and the occupant interfacing surface. A larger airbag can present challenges to properly deploy. These challenges include, but are not limited to, challenges related to timely filling the airbag to receive an occupant and generating sufficient inflation gas to fill the airbag.

As described above, some vehicles may comprise a dashboard and/or an instrument panel. The dashboard and/or the instrument panel may include a knee bolster. During a collision event, a vehicle occupant's knees may engage the knee bolster, and the knee bolster may be configured to deform or crush upon impact with the knees of the vehicle occupant. The knee bolster may be a component of an occupant restraint system. A vehicle with a larger passenger compartment, as discussed above, may not include a knee bolster. In some embodiments, an airbag assembly of the present disclosure may at least partially compensate for a lack of a knee bolster. In some other embodiments, an airbag assembly of the present disclosure may augment an occupant restraint system that includes a knee bolster. Additionally, an airbag assembly of the present disclosure may deploy into a smaller volume, weigh less, and/or cost less to manufacture than some other airbag assemblies.

Figure 1B:
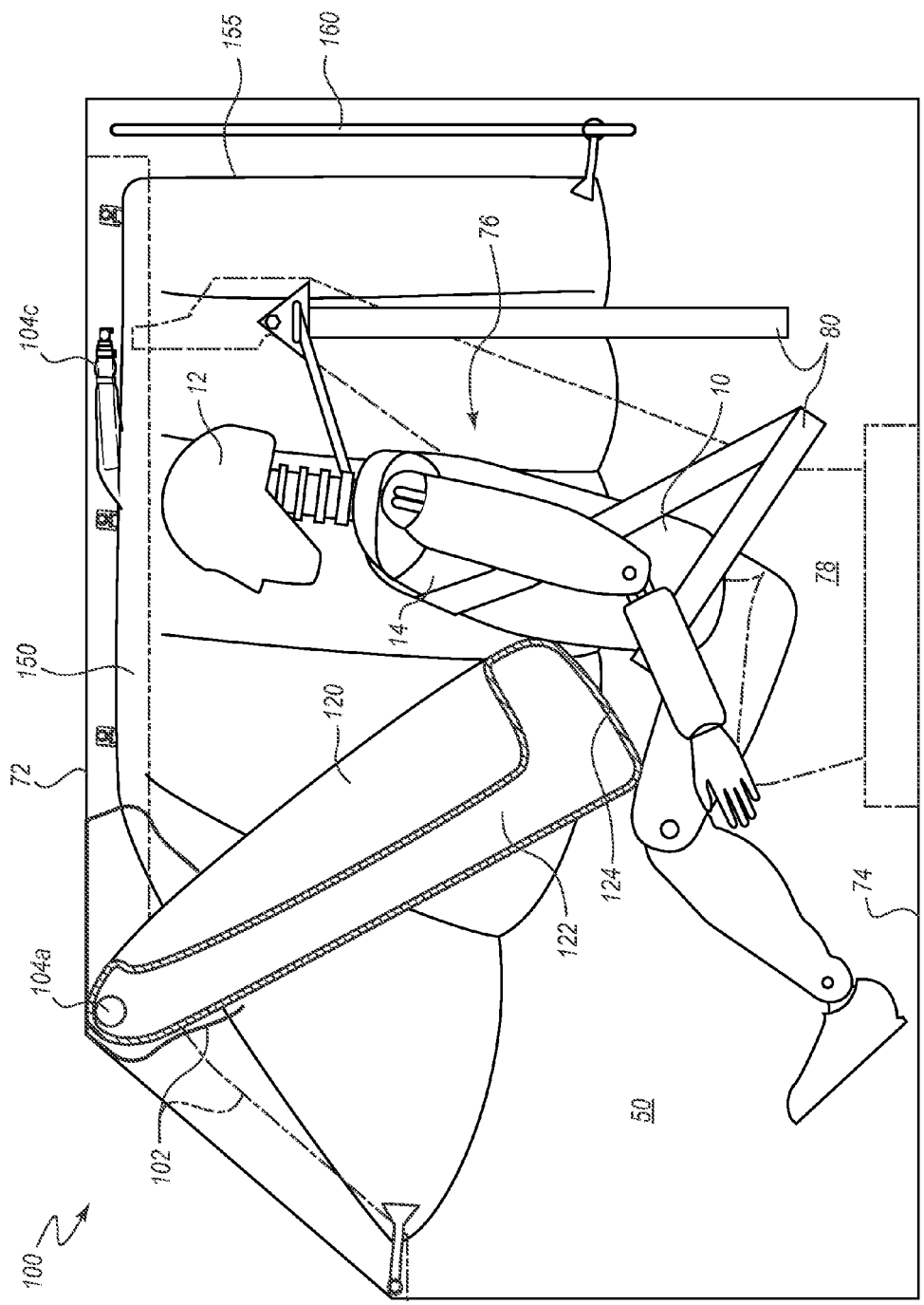
FIG. 1B is a side elevation view of the airbag assembly of FIG. 1A with the airbag assembly in a deployed state.

FIGS. 1A and 1B depict an embodiment of an airbag assembly 100 mounted within a vehicle 50. In FIG. 1A, the airbag assembly 100 is in a packaged state, whereas in FIG. 1B, the airbag assembly 100 is in a deployed state. The airbag assembly 100 can include a frontal inflatable cushion 120, which can be coupled to the vehicle 50 in any suitable manner. The frontal inflatable cushion 120 may also be referred to herein as an inflatable cushion or a frontal airbag. The airbag assembly 100 can also include a side inflatable cushion 150, which can also be coupled to the vehicle 50 in any suitable manner. The side inflatable cushion 150 may also be referred to herein as an inflatable cushion, a side airbag, or a side inflatable curtain airbag. A vehicle occupant 10 is shown seated in a front seat 78 of the vehicle 50. An occupant restraint system of the vehicle 50 can include the airbag assembly 100. The occupant restraint system may include other suitable restraint devices, such as a seatbelt 80.

With reference to FIG. 1A, each of the frontal inflatable cushion 120 and the side inflatable cushion 150 is positioned within a housing assembly 102 when the airbag assembly 100 is not deployed. The housing assembly 102 is mounted or otherwise coupled to the vehicle 50 at a roof 72 of a passenger compartment of the vehicle 50. In some embodiments, each of the inflatable cushions of the airbag assembly 100 may be coupled to a discrete or separate housing or housing assembly 102. In some other embodiments, two or more of the inflatable cushions of the airbag assembly 100 may be coupled to a single housing assembly 102. Other configurations of housing assemblies and inflatable cushions of the airbag assembly 100 are also within the scope of this disclosure.

As shown in FIG. 1B, the frontal inflatable cushion 120 defines an inflatable chamber 122, wherein the inflatable chamber 122 is configured to receive inflation gas from an inflator assembly 104a, 104b, 104c (collectively 104) to expand the frontal inflatable cushion 120 from the packaged state within the housing assembly (see FIG. 1A) to the deployed state (see FIG. 1B). In some embodiments, the inflator assembly 104 may comprise a frontal inflator 104a, a first side inflator 104b (see FIG. 2), and/or a second side inflator 104c. The frontal inflator 104a can be coupled to, or in fluid communication with, the frontal inflatable cushion 120; the first side inflator 104b can be coupled to, or in fluid communication with, a first side inflatable cushion 140 (see FIG. 2); and the second side inflator 104c can be coupled to, or in fluid communication with, a second side inflatable cushion 150. Additionally, the frontal inflator 104a, the first side inflator 104b, and the second side inflator 104c may each comprise a single-stage inflator and/or a multiple stage inflator. Other configurations of the inflator assembly 104 are also within the scope of this disclosure.

The frontal inflatable cushion 120 may be configured to deploy downward and rearward from the housing assembly 102. For example, the frontal inflatable cushion 120 may extend at an angle from a position at a forward portion of the roof 72 of the vehicle 50 downward and rearward toward a floor 74 of the vehicle 50 when the frontal inflatable cushion 120 is in the deployed state. Stated another way, the frontal inflatable cushion 120 may be configured to deploy toward a lap of a vehicle occupant 10. In some other embodiments, the frontal inflatable cushion 120 may be configured to deploy in a different direction (e.g., substantially downward only). The deployment direction may depend on positioning of the housing assembly 102 at the roof 72 relative to a vehicle occupant position 76 (e.g., a position typically occupied by a vehicle occupant 10 seated in the seat 78). When the frontal inflatable cushion 120 is in the deployed state, the frontal inflatable cushion 120 may be configured to receive at least a portion of a head 12 and/or at least a portion of a torso 14 of the vehicle occupant 10 moving from the vehicle occupant position 76 in a forward direction relative to the vehicle 50 during a vehicle impact event.

A rearward edge 155 of the side inflatable cushion 150 can be coupled to a portion of the vehicle 50 (e.g., a fixed portion of the vehicle such as a pillar, roof rail, floor, and/or frame) to secure the side inflatable cushion 150 against forward movement relative to the vehicle 50. For example, as shown in FIGS. 1A and 1B, the rearward edge 155 may be coupled to a sliding rail assembly 160, wherein the sliding rail assembly 160 is configured to couple the rearward edge 155 of the side inflatable cushion 150 to the vehicle 50. As discussed in further detail below, the configuration of the side inflatable cushion 150 and the sliding rail assembly 160 may provide support of a lower edge 124 of the frontal inflatable cushion 120 in the rearward direction relative to the vehicle 50.

Figure 2:
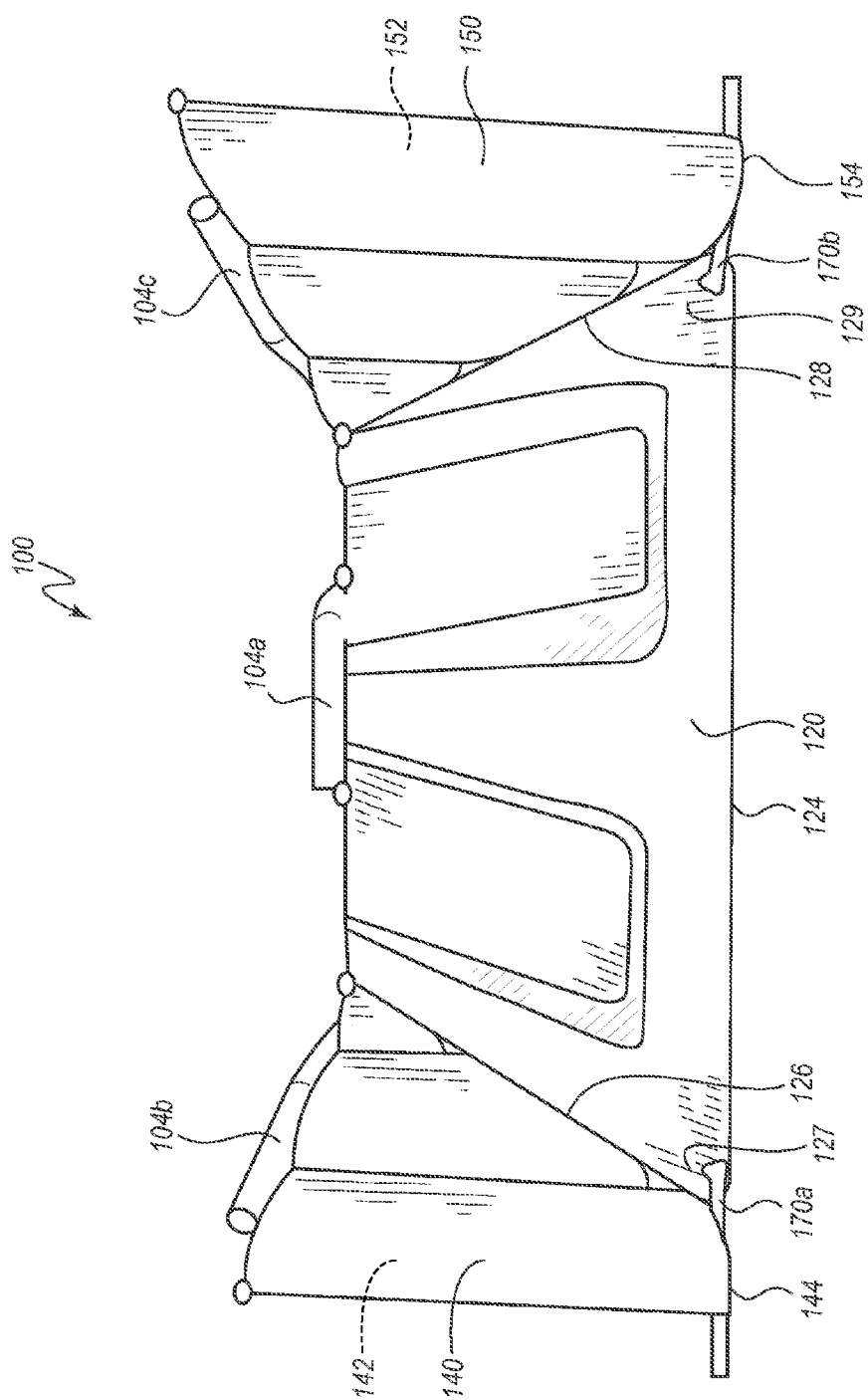
FIG. 2 is a view from a vehicle occupant position of the airbag assembly of FIG. 1A in the deployed state.

FIG. 2 is a view from a vehicle occupant position 76 (see FIGS. 1A and 1B) of the airbag assembly 100 in the deployed state. In some embodiments, the frontal inflatable cushion 120, in the packaged state and/or in the deployed state, may be coupled to one or more support components within the passenger compartment of the vehicle. For example, when the frontal inflatable cushion 120 is in the deployed state, the one or more support components may provide support of a lower edge 124 of the frontal inflatable cushion 120 in a substantially rearward direction relative to the vehicle. Such a configuration may enable the frontal inflatable cushion 120 to restrain movement of a vehicle occupant in the forward direction during a vehicle impact event. In certain embodiments, the frontal inflatable cushion 120 may be configured to receive at least a portion of a head and/or at least a portion of a torso of one or more occupants (e.g., a passenger and/or a driver) of the vehicle to restrain forward movement of the occupants relative to the vehicle during a vehicle impact event.

In the illustrated embodiment, a first support component 140 comprises a first side inflatable curtain airbag. Additionally, a second support component 150 comprises a second side inflatable curtain airbag. As shown, the first side inflatable curtain airbag 140 is disposed at a first side of the passenger compartment of the vehicle, and the second side inflatable curtain airbag 150 is disposed at a second side of the passenger compartment of the vehicle. The first side of the passenger compartment of the vehicle is opposite the second side of the passenger compartment of the vehicle. In some other embodiments, the first and second support components may comprise one or more sliding rails, tethers, membranes, nets, panels, stitching, and/or any other suitable support mechanism to support of a lower edge 124 of the frontal inflatable cushion 120.

The frontal inflatable cushion 120, the first side inflatable cushion 140, and the second side inflatable cushion 150 may be manufactured in any suitable manner, such as via one-piece weaving, "cut and sew" techniques, or a combination thereof. In some embodiments, separate panels may be joined together using sealed or unsealed seams, wherein the seams are formed by stitching, adhesive, taping, radiofrequency welding, heat sealing, and/or any other suitable technique or combination of techniques.

The frontal inflatable cushion 120 may be coupled to the first support component 140 at a first lateral edge 126 of the frontal inflatable cushion 120. The frontal inflatable cushion 120 may also be coupled to the second support component 150 at a second lateral edge 128 of the frontal inflatable cushion 120. As illustrated, the frontal inflatable cushion 120 comprises both a first lower corner portion 127 and a second lower corner portion 129, wherein the frontal inflatable cushion 120 is coupled to the first side inflatable cushion 140 at or adjacent the first lower corner portion 127, and wherein the frontal inflatable cushion 120 is further coupled to the second side inflatable cushion 150 at or adjacent the second lower corner portion 129. In some embodiments, a different portion or different portions of the frontal inflatable cushion 120 may be coupled to each of the first and second side inflatable cushions 140, 150. For example, in addition to, or instead of, being coupled to the first side inflatable cushion 140 at or adjacent the first lower corner portion 127, a position at a mid-point of the first lateral edge 126 may also, or alternatively, be coupled to the first side inflatable cushion 140.

In the illustrated embodiment of FIG. 2, the frontal inflatable cushion 120 is coupled to the first side inflatable cushion 140 at a position at or adjacent a lower edge 144 of the first side inflatable cushion 140, and the frontal inflatable cushion 120 is likewise coupled to the second side inflatable cushion 150 at a position at or adjacent a lower edge 154 of the second side inflatable cushion 150. The frontal inflatable cushion 120 of FIG. 2 is coupled to the first side inflatable cushion 140 via a first tether 170a and the frontal inflatable cushion 120 is coupled to the second side inflatable cushion 150 via a second tether 170b. In some other embodiments, the frontal inflatable cushion 120 may be coupled to one or both of the first and second side inflatable cushions 140, 150 via one or more membranes, nets, panels, stitching, and/or any other suitable coupling mechanism.

In certain embodiments, the coupling of the frontal inflatable cushion 120 to each of the first side inflatable cushion 140 and the second side inflatable cushion 150 may be configured to limit forward movement of the frontal inflatable cushion 120 when the frontal inflatable cushion 120 is in the deployed state. For example, upon engagement with, or being struck by, a vehicle occupant during a vehicle impact event, forward movement of the frontal inflatable cushion 120 can be limited, at least in part, due to the coupling of the frontal inflatable cushion 120 to the first and/or the second side inflatable cushions 140, 150.

The one or more support components may comprise the first side inflatable cushion 140, wherein the first side inflatable cushion 140 defines a first side inflatable chamber 142 that can be configured to receive inflation gas from the inflator assembly or the first side inflator 104b to expand the first side inflatable cushion 140 from a packaged state to a deployed state. In various embodiments, the first side inflatable cushion 140 may be configured to deploy substantially simultaneously with the frontal inflatable cushion 120, and the first side inflatable cushion 140 may deploy substantially downward. Likewise, the one or more support components may comprise the second side inflatable cushion 150, wherein the second side inflatable cushion 150 defines a second side inflatable chamber 152 that can be configured to receive inflation gas from the inflator assembly or the second side inflator 104c to expand the second side inflatable cushion 150 from a packaged state to a deployed state. In various embodiments, the second side inflatable cushion 150 may be configured to deploy substantially simultaneously with each of the frontal inflatable cushion 120 and the first side inflatable cushion 140, and the second side inflatable cushion 150 may deploy substantially downward.

The frontal inflatable cushion 120 may be secured to the support components in both the packaged state and the deployed state. For example, in the embodiment of FIG. 2, the frontal inflatable cushion 120 in the packaged state is coupled, via the tethers 170a, 170b, to the first side inflatable cushion 140 and the second side inflatable cushion 150. The frontal inflatable cushion 120 remains coupled, via the tethers 170a, 170b, to the first side inflatable cushion 140 and the second side inflatable cushion 150 through deployment to the deployed state. As previously noted, the coupling of the frontal inflatable cushion 120 to the first side inflatable cushion 140 and the second side inflatable cushion 150 provides support to the lower edge 124 of the frontal inflatable cushion 120 to enable restraint of forward movement relative to the vehicle of one or more vehicle occupants during an impact event.

In some embodiments, each of the frontal inflatable cushion 120, the first side inflatable cushion 140, and the second side inflatable cushion 150 may be disposed in, and deploy from, a single housing assembly. For example, the frontal inflatable cushion 120 may be configured to deploy from a frontal portion of the housing assembly, wherein the frontal portion of the housing assembly is configured to be disposed in a head liner of the vehicle or a front portion of the roof of the vehicle. The first side inflatable cushion 140 may be configured to deploy from a first side portion of the housing assembly, wherein the first side portion of the housing assembly is disposed in a first side portion of the roof of the vehicle. Further, the second side inflatable cushion 150 may be configured to deploy from a second side portion of the housing assembly, wherein the second side portion of the housing assembly is disposed in a second side portion of the roof of the vehicle. The first side portion of the roof of the vehicle may be disposed opposite the second side portion of the roof of the vehicle.

With continued reference to FIG. 2, the inflator assembly can include a frontal inflator 104a disposed in the frontal portion of the housing assembly and coupled to the frontal inflatable cushion 120, a first side inflator 104b disposed in the first side portion of the housing assembly and coupled to the first side inflatable cushion 140, and a second side inflator 104c disposed in a second side portion of the housing assembly and coupled to the second side inflatable cushion 150.

In other embodiments, the inflator assembly may include a single inflator configured to inflate each of the frontal inflatable cushion 120, the first side inflatable cushion 140, and the second side inflatable cushion 150. The single inflator may be a single stage or a multiple stage inflator. The frontal inflatable cushion 120 may couple to the first side inflatable cushion 140 and the second side inflatable cushion 150 via conduits configured to direct inflation gas from the inflator to the first side inflatable cushion 140 and the second side inflatable cushion 150. In other embodiments, the conduits may direct inflation gas from the frontal inflatable cushion 120 and into to the first side inflatable cushion 140 or into the second side inflatable cushion 150.

Figure 3:
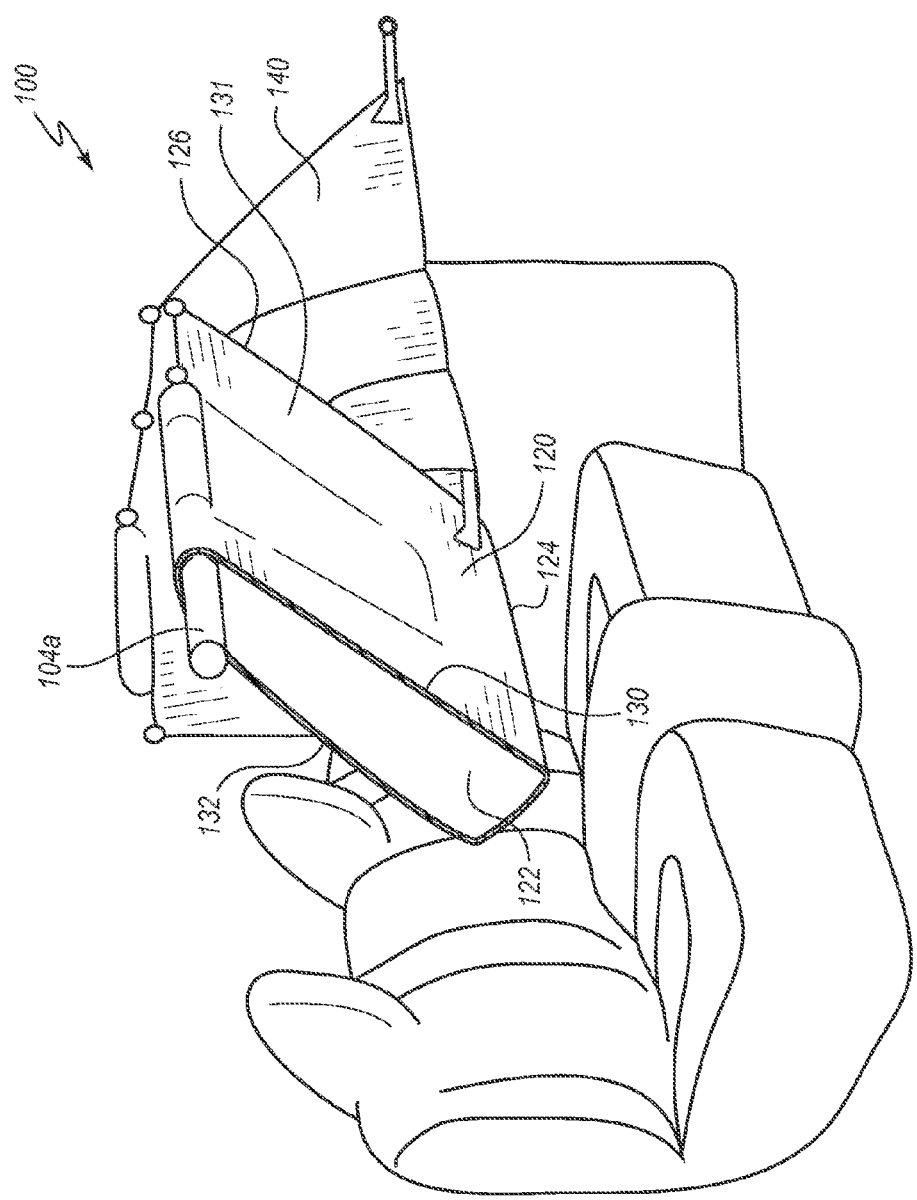
FIG. 3 is a front perspective partial sectional view of the airbag assembly of FIG. 1A with the airbag assembly in the deployed state.

FIG. 3 is a perspective view of a front surface 131 of the frontal inflatable cushion 120, wherein the frontal inflatable cushion 120 is depicted in partial cross-section. In some embodiments, the front surface 131 of the frontal inflatable cushion 120, when the frontal inflatable cushion 120 is in a deployed state, may be disposed a distance from an occupant interfacing surface (described above) in the passenger compartment of the vehicle. Generally an occupant interfacing surface provides a reaction surface for an airbag (e.g., a surface against which an airbag reacts during loading of the airbag by an occupant). The presently disclosed embodiments provide frontal airbag cushions that restrain forward movement of an occupant without a reaction surface. In particular, the frontal inflatable cushion 120 is configured to restrain forward movement of a vehicle occupant relative to the vehicle without the front surface 131 engaging an occupant interfacing surface and/or without relying upon the occupant interfacing surface or another surface as a reaction surface during occupant loading of the frontal inflatable cushion 120.

The frontal inflatable cushion 120 may be coupled to one or more support components such that forward movement of the frontal inflatable cushion 120 may be limited or prevented. As noted, forward movement of the frontal inflatable cushion 120 may be limited or prevented without reliance upon a reaction surface (e.g., such as an occupant interfacing surface). In some embodiments, the frontal inflatable cushion 120 may be configured such that the front surface 131 of the frontal inflatable cushion 120 does not come into contact with or engage an occupant interfacing surface during an impact event. As such, the frontal inflatable cushion 120 of the present disclosure may be thinner and/or lighter than some other airbags that are configured to contact an occupant interfacing surface. The frontal inflatable cushion 120 may also occupy a smaller volume upon deployment and/or be less costly to manufacture than some other airbags that are configured to contact an occupant interfacing surface.

As depicted in FIG. 3, the frontal airbag assembly 100 can comprise an inflator 104a and a frontal inflatable cushion 120 coupled to the inflator 104a and configured to be deployed from within a housing 102 (see FIG. 1A) mountable within a roof of a vehicle. The frontal inflatable cushion 120 can comprise a front face 130 and a rear face 132 that cooperate to form an inflatable chamber or void 122 for receiving inflation gas from the inflator 104a and that define a first lateral edge 126, a second lateral edge 128 (see FIG. 2), and a distal or lower edge 124.

In certain embodiments, the frontal inflatable cushion 120 may be configured to deploy initially in a substantially vertical downward direction. Subsequently, upon deployment of the first side inflatable cushion 140 and/or the second side inflatable cushion, the frontal inflatable cushion 120 may be configured to deploy rearward. Such a deployment of the frontal inflatable cushion 120 may result in a deployed frontal inflatable cushion 120 disposed at a rearward facing angle as depicted in FIG. 3.

Figure 4:
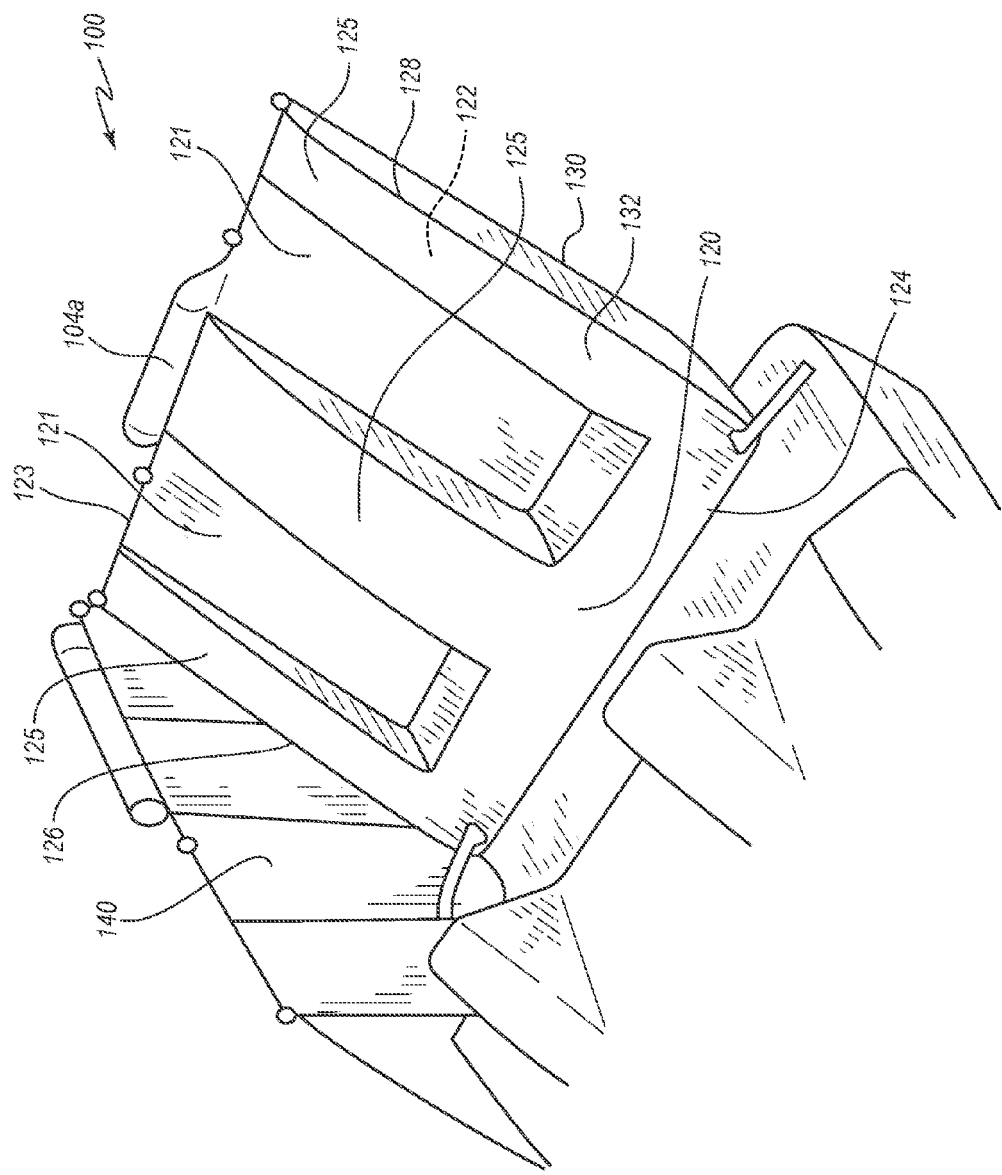
FIG. 4 is a rear perspective view of a portion of the airbag assembly of FIG. 1A in the deployed state.

FIG. 4 is a rear perspective view of the frontal airbag assembly 100. As depicted, the frontal airbag assembly 100 can comprise an inflator 104a, and a frontal inflatable cushion 120 coupled to the inflator 104a. The frontal inflatable cushion 120 may be configured to be deployed from within a housing (not shown) wherein the housing is mountable within a roof of a vehicle. As discussed above, the frontal inflatable cushion 120 can comprise a front face 130 and a rear face 132 that cooperate to form an inflatable chamber or void 122 for receiving an inflation gas from the inflator 104a and that define a first lateral edge 126, a second lateral edge 128, and a distal or lower edge 124.

Upon reception of the inflation gas within the void 122, the inflatable cushion 120 may be configured to transition from a packaged state or configuration (see FIG. 1A) within the housing to a deployed state or configuration (see FIG. 4). In some embodiments, the inflatable cushion 120 may be configured to initially deploy downward in a substantially vertical direction relative to the housing. Then, the inflatable cushion 120 may be configured to subsequently deploy both downward and rearward relative to the housing.

In certain embodiments, a proximal edge 123 of the inflatable cushion 120 can be coupled to the vehicle via the housing. Further, the first lateral edge 126 may be coupled to the vehicle via a first side curtain airbag 140 or another suitable support component, as discussed above, and the second lateral edge 128 can be coupled to the vehicle via a second side curtain airbag or another suitable support component.

As illustrated, the void 122 of the frontal inflatable cushion 120 is substantially W shaped, wherein non-inflatable portions 121 are disposed between inflatable portions 125 of the W-shaped void 122 of the frontal inflatable cushion 120. Other configurations of one or more inflatable portions 125 and one or more non-inflatable portions 121 are also contemplated. For example, the frontal inflatable cushion 120 may be substantially U shaped. In some other embodiments, the frontal inflatable cushion 120 may not comprise a non-inflatable portion 121, for example, the frontal inflatable cushion 120 may comprise a single inflatable portion 125. Each of the inflatable cushions of the airbag assembly 100 can comprise any suitable shape. For example, in some embodiments, the inflatable cushion 120 may be a curtain airbag configuration. At least one of the non-inflatable portions 121 may be configured, in some embodiments, to receive at least a portion of a head and/or at least a portion of a torso of a vehicle occupant when the vehicle occupant moves from a vehicle occupant position primarily in a forward direction relative to the vehicle. Likewise, at least one of the inflatable portions 125 may be configured, in some other embodiments, to receive at least a portion of a head and/or at least a portion of a torso of a vehicle occupant when the vehicle occupant moves from a vehicle occupant position primarily in a forward direction relative to the vehicle.

Figure 5:
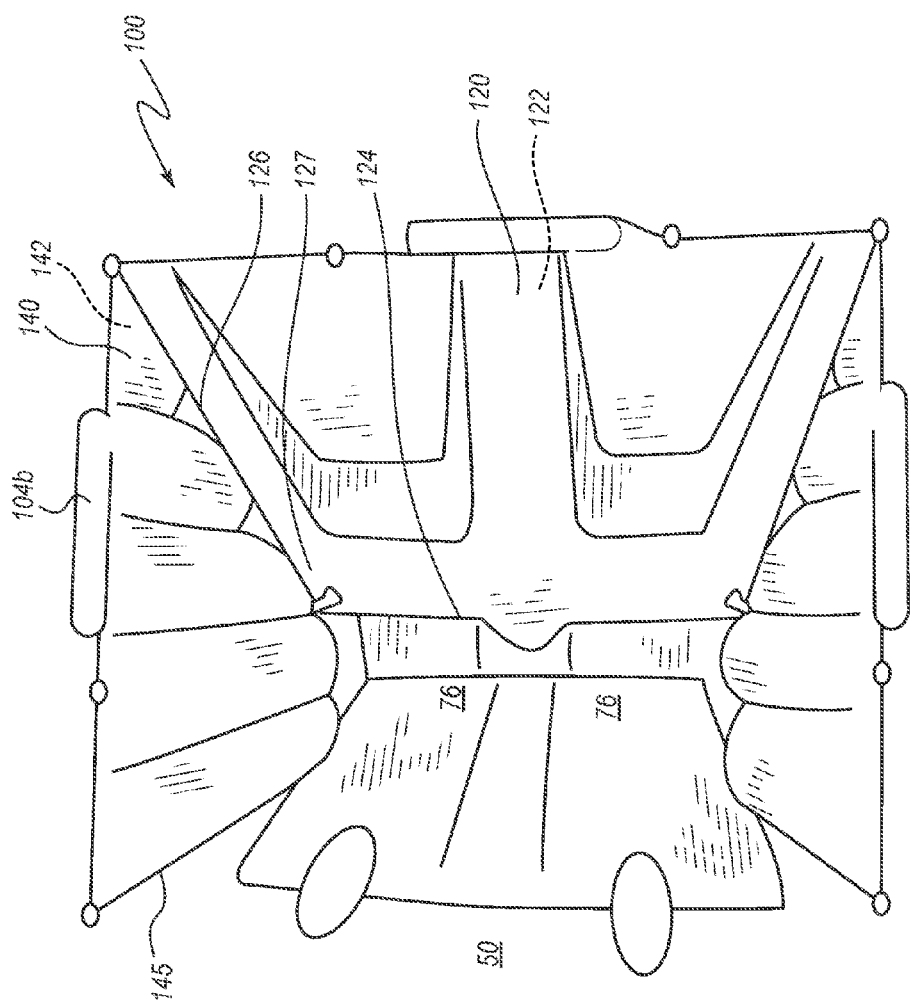
FIG. 5 is a top view of the airbag assembly of FIG. 1A, in the deployed state.

FIG. 5 is a top view of the airbag assembly 100 in a deployed state. The airbag assembly 100, as discussed above, may comprise a housing assembly 102 (see FIG. 1A) configured to be disposed or mounted in the roof of the vehicle 50. As illustrated, the airbag assembly 100 can further comprise a frontal inflatable cushion 120 defining an inflatable chamber 122 that is configured to receive inflation gas from an inflator assembly disposed within the housing assembly to expand the frontal inflatable cushion 120 from a packaged state to a deployed state. The frontal inflatable cushion 120 may be further configured to deploy from the housing assembly, wherein the frontal inflatable cushion 120 can be configured to deploy in both a downward direction and a rearward direction relative to the housing assembly or a front of the vehicle 50.

As shown in FIG. 5, the airbag assembly 100 can further comprise at least one side inflatable cushion 140 defining an inflatable chamber 142 that is configured to receive inflation gas from the inflator assembly or the inflator 104b to expand the side inflatable cushion 140 from a packaged state to a deployed state. The side inflatable cushion 140 may be configured to deploy from the housing assembly substantially simultaneously with the frontal inflatable cushion 120, and the side inflatable cushion 140 may be configured to deploy in a substantially downward direction relative to the housing assembly. As depicted, the side inflatable cushion 140 can be coupled to the frontal inflatable cushion 120 at or adjacent a position along an outside lateral edge 126 of the frontal inflatable cushion 120.

In some embodiments, the frontal inflatable cushion 120 may be configured to deploy from a frontal portion of the housing assembly, wherein the frontal portion of the housing assembly may be mounted in or at the roof of the vehicle 50 at a position forward relative to a vehicle occupant position 76. Additionally, the side inflatable cushion 140 may be configured to deploy from a side portion of the housing assembly, wherein the side portion of the housing assembly is mounted at a position in or at the roof of the vehicle 50 at a position lateral relative to the vehicle occupant position 76.

With continued reference to FIG. 5, the frontal inflatable cushion 120 can comprise a corner portion 127 at a junction of the lateral edge 126 and a distal edge 124 of the frontal inflatable cushion 120. The side inflatable cushion 140 can be coupled to the frontal inflatable cushion 120 at the corner portion 127 such that the side inflatable cushion 140 may be configured to support the frontal inflatable cushion 120 when the frontal inflatable cushion 120 is in the deployed state. To further support the frontal inflatable cushion 120, a rearward edge 145 of the side inflatable cushion 140 can be coupled to the vehicle (e.g., via a sliding rail assembly, a tether, and/or other securement device).

In certain embodiments, deployment of the frontal inflatable cushion 120 may comprise a first stage and a second stage, wherein the first stage may comprise a deployment of the frontal inflatable cushion 120 in a substantially vertical downward direction, and wherein the second stage may comprise a deployment of the frontal inflatable cushion 120 in a substantially downward and rearward direction.

Figure 6B:
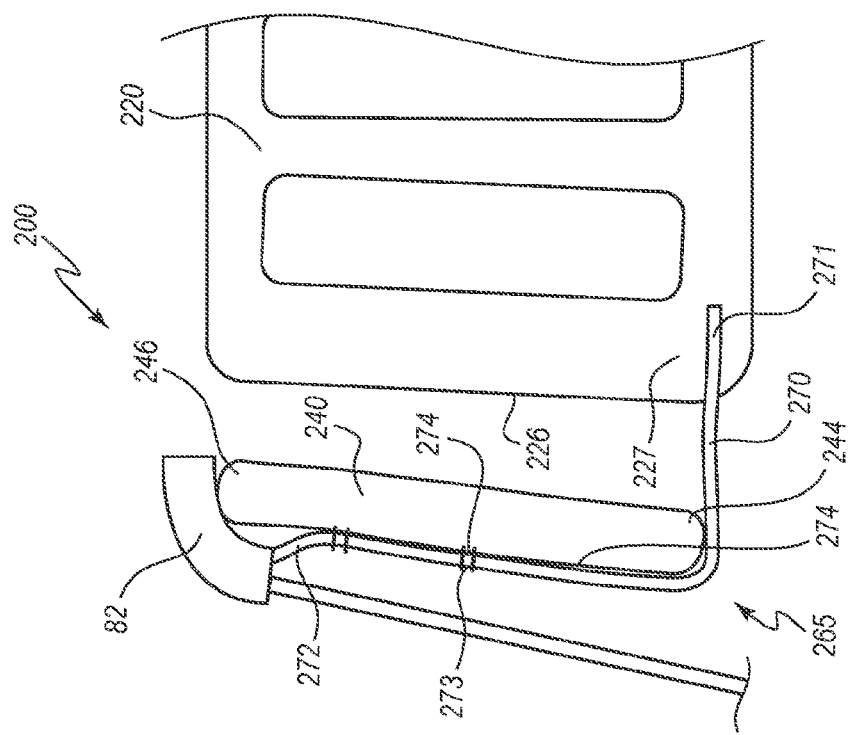
FIG. 6B is a front view of the tether system of FIG. 6A in a deployed state.
Figure 6A:
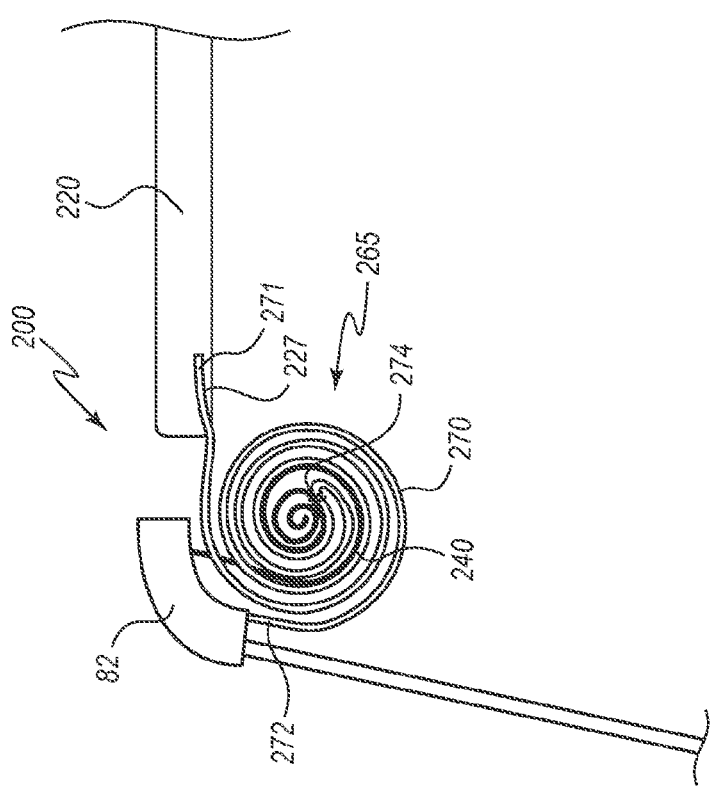
FIG. 6A is a front view of a tether system according to one embodiment of the present disclosure, in a packaged state within a vehicle

FIG. 6A is a front view of an airbag assembly 200 that can resemble the airbag assembly 100 described above in certain respects. Accordingly, like features are designated with like reference numerals, with the leading digits incremented to "2." Relevant disclosure set forth above regarding similarly identified features thus may not be repeated hereafter. Moreover, specific features of the airbag assembly 200 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag assembly 200. Any suitable combination of the features and variations of the same described with respect to the airbag assembly 100 can be employed with the airbag assembly 200, and vice versa. This pattern of disclosure applies equally to further embodiments depicted in subsequent figures and described hereafter, wherein the leading digits may be further incremented.

FIG. 6A is a front view of a tether system 265 of the airbag assembly 200, according to one embodiment of the present disclosure, in a packaged state within a vehicle. FIG. 6B is a front view of the tether system 265 of FIG. 6A in a deployed state. In the illustrated embodiment, the tether system 265 comprises a tether 270. A first end portion 271 of the tether 270 is coupled to a frontal inflatable cushion 220 at a first lower corner portion 227 of the frontal inflatable cushion 220. In some embodiments, the first end portion 271 of the tether 270 may be coupled to a different portion of the frontal inflatable cushion 220. For example, the first end portion 271 of the tether 270 may be coupled to the frontal inflatable cushion 220 at a position at a mid-point of a first lateral edge 226 of the frontal inflatable cushion 220. Furthermore, as depicted, a second end portion 272 of the tether 270 is coupled to a side inflatable cushion 240. The second end portion 272 of the tether 270 can also, or alternatively, be coupled to a portion of the vehicle (i.e., a roof rail 82 of the vehicle). In the illustrated embodiment, the second end portion 272 of the tether 270 is coupled to each of the side inflatable cushion 240 and a side roof rail 82 of the vehicle. Additional portions of the tether 270 may also be coupled to the side inflatable cushion 240. For example, as depicted, a mid-portion 273 of the tether 270 can be coupled to the side inflatable cushion 240 (i.e., via tack stitching 274). The tether 270, and other tethers described herein, may be coupled to the frontal inflatable cushion 220, the side inflatable cushion 240, and/or a portion of the vehicle via stitching (i.e., tack stitching), a clip and/or ring assembly, a button and loop assembly, a toggle bar and loop assembly, and/or any other suitable coupling arrangement or mechanism.

FIGS. 6A and 6B, as depicted, are partial frontal views of the airbag assembly 200. In various embodiments, the airbag assembly 200 may further comprise a second tether system analogous to the tether system 265, wherein the second tether system is coupled to each of a second lateral edge of the frontal inflatable cushion 220 and a second side inflatable cushion that is disposed at an opposite side of the passenger compartment of the vehicle in relation to the side inflatable cushion 240.

With reference to FIG. 6A, in the packaged state, at least a portion of the tether 270 may be rolled around, or otherwise packaged with, at least a portion of the side inflatable cushion 240. Upon deployment of the airbag assembly 200, deployment of the side inflatable cushion 240 may cause or result in unrolling or unpackaging of the tether 270. For example, during a first portion of the deployment, the packaged side inflatable cushion 240 and/or the tether 270 may unroll in a first direction (e.g., in a counterclockwise direction). Subsequently, during a second portion of the deployment, the partially packaged inflatable cushion 240 and/or the tether 270 may unroll in a second direction (e.g., in a clockwise direction). The tether 270 may be doubled over, or folded over on itself, when the tether 270 is rolled or packaged with the side inflatable cushion 240. As depicted, the tether 270 is doubled over at or adjacent the tack stitching 274.

With reference to FIG. 6B, in the deployed state, the tether 270 can extend from a position at or adjacent an upper edge 246 of the side inflatable cushion 240. The tether 270 can then extend along an outside surface 247 of the side inflatable cushion 240 and continue, extending around a lower edge 244 of the side inflatable cushion 240.

In some embodiments, as discussed above, the coupling of the frontal inflatable cushion 220 to the side inflatable cushion 240 and/or to the second side inflatable cushion may be configured to limit forward and/or upward movement of the frontal inflatable cushion 220 when the frontal inflatable cushion 220 is in the deployed state. For example, upon engagement with, or being struck by, a vehicle occupant during a vehicle impact event, forward and/or upward movement of the frontal inflatable cushion 220 can be limited, at least in part, due to the coupling of the first inflatable cushion 220 to the side inflatable cushion 240 and/or the second side inflatable cushion.

FIG. 7A is a front view of a tether system 365 of an airbag assembly 300 according to another embodiment of the present disclosure, in a packaged state within a vehicle. FIG. 7B is a front view of the tether system 365 of FIG. 7A in a deployed state. As illustrated, the tether system 365 comprises a tether 370. A first end portion 371 of the tether 370 is coupled to a frontal inflatable cushion 320 at a first lower corner portion 327 of the frontal inflatable cushion 320. As discussed above in reference to the tether system 265 of FIGS. 6A and 6B, in some embodiments, the first end portion 371 of the tether 370 may be coupled to a different portion of the frontal inflatable cushion 320. As depicted, the tether 370 also comprises a second end portion 372. The second end portion 372 is coupled to a side inflatable cushion 340.

FIGS. 7A and 7B are partial frontal views of the airbag assembly 300. In various embodiments, the airbag assembly 300 may further comprise a second tether system analogous to the tether system 365, wherein the second tether system is coupled to each of a second lateral edge of the frontal inflatable cushion 320 and a second side inflatable cushion that is disposed at an opposite side of the passenger compartment of the vehicle in relation to the side inflatable cushion 340.

With reference to FIG. 7A, in the packaged state, at least a portion of the tether 370 may be folded or bunched-up adjacent to or around the packaged side inflatable cushion 340. For example, the side inflatable cushion 340 may be at least partially rolled around itself in the packaged state and at least a portion of the tether 370 may be folded in a Z-fold or accordion fold pattern adjacent the packaged side inflatable cushion 340. Upon deployment of the airbag assembly 300, the side inflatable cushion 340 may be unrolled or unpackaged. The deployment of the side inflatable cushion 340 may cause or result in unfolding or unpackaging of the tether 370.

With reference to FIG. 7B, in the deployed state, the tether 370 may extend from a position at or adjacent an upper edge 346 of the side inflatable cushion 340 along an outside surface 347 of the side inflatable cushion 340 and around a lower edge 344 of the side inflatable cushion 340. In some embodiments, as discussed above, the coupling of the frontal inflatable cushion 320 to the side inflatable cushion 340 and/or a second side inflatable cushion may be configured to limit forward and/or upward movement of the frontal inflatable cushion 320 when the frontal inflatable cushion 320 is in the deployed state. For example, upon engagement with, or being struck by, a vehicle occupant during a vehicle impact event, forward and/or upward movement of the frontal inflatable cushion 320 can be limited, at least in part, due to the coupling of the first inflatable cushion 320 to the side inflatable cushion 340 and/or the second side inflatable cushion.

Figure 8B:
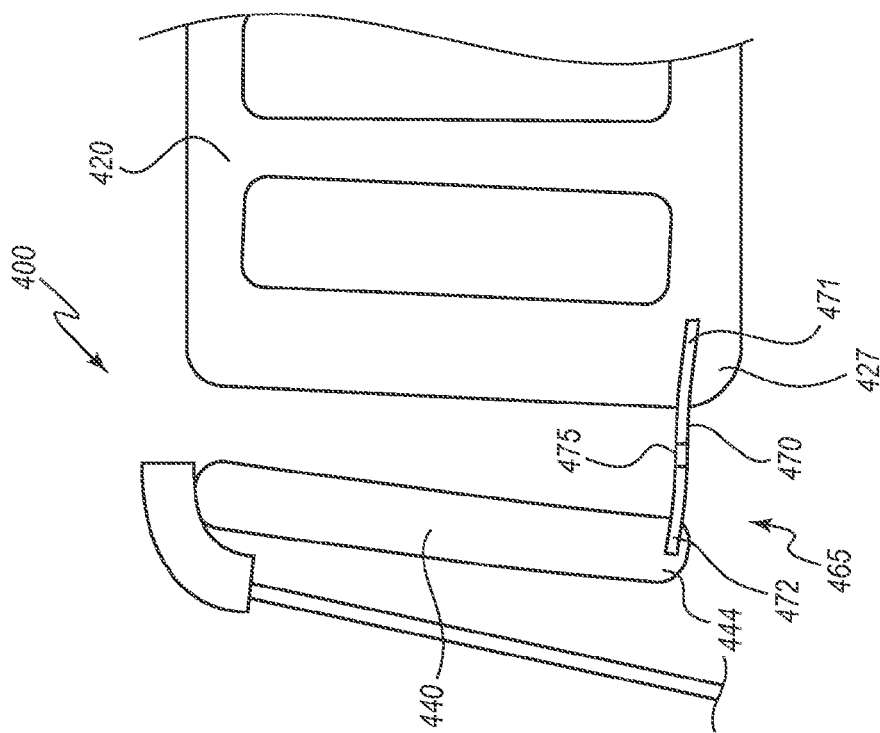
FIG. 8B is a front view of the tether system of FIG. 8A in a deployed state.
Figure 8A:
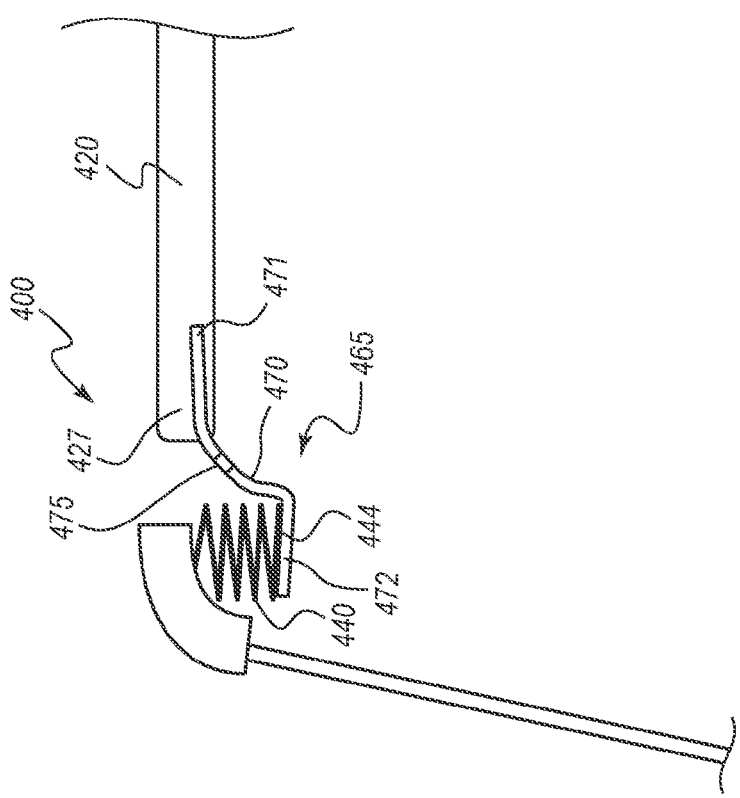
FIG. 8A is a front view of a tether system according to another embodiment of the present disclosure, in a packaged state within a vehicle

FIG. 8A is a front view of a tether system 465 of an airbag assembly 400 according to yet another embodiment of the present disclosure, in a packaged state within a vehicle. FIG. 8B is a front view of the tether system 465 of FIG. 8A in a deployed state. As illustrated, the tether system 465 comprises a tether 470. A first end portion 471 of the tether 470 is coupled to a frontal inflatable cushion 420 at a first lower corner portion 427 of the frontal inflatable cushion 420. As discussed above in reference to the tether systems 265, 365, in some embodiments, the first end portion 471 of the tether 470 may be coupled to a different portion of the frontal inflatable cushion 420. As depicted, the tether 470 further comprises a second end portion 472. The second end portion 472 of the tether 470 is coupled to a side inflatable cushion 440 at a position at or adjacent a lower edge 444 of the side inflatable cushion 420.

The tether 470 may comprise at least a first portion and a second portion, wherein the first portion and the second portion are coupled together at a coupling position 475. Coupling at least two tethers to form or generate the tether 470 may aid in the folding, rolling, and/or packaging of the airbag assembly 400 and/or the tether system 465. For example, the side inflatable cushion 440 and a first portion of the tether 470 may be folded, rolled, and/or packaged prior to being coupled to a second portion of the tether and the frontal inflatable cushion 420, or vice versa. The first portion and the second portion of the tether 470 may be coupled via stitching (i.e., tack stitching), a clip and/or ring assembly, a button and loop assembly, a toggle bar and loop assembly, and/or another suitable coupling arrangement or mechanism. A tether comprising a first portion and a second portion as described herein may be used in combination with any of the tether systems described herein.

FIGS. 8A and 8B are partial frontal views of the airbag assembly 400. In various embodiments, the airbag assembly 400 may further comprise a second tether system analogous to the tether system 465, wherein the second tether system is coupled to each of a second lateral edge of the frontal inflatable cushion 420 and a second side inflatable cushion that is disposed at an opposite side of the passenger compartment of the vehicle in relation to the side inflatable cushion 440.

With reference to FIG. 8A, in the packaged state, at least a portion of the side inflatable cushion 420 is folded or packaged into a Z-fold or an accordion fold. Upon deployment of the airbag assembly 400, the side inflatable cushion 440 may be unfolded or unpackaged. Further, the side inflatable cushion 440 and the frontal inflatable cushion 420 may be deployed substantially simultaneously. As illustrated in FIG. 8B, in the deployed state, the tether 470 may extend from a position at or adjacent a lower edge 444 of the side inflatable cushion 440 to a position at or adjacent a first lower corner portion 427 of the frontal inflatable cushion 420.

In some embodiments, as discussed above, the coupling of the frontal inflatable cushion 420 to each of the side inflatable cushion 440 and/or a second side inflatable cushion may be configured to limit forward and/or upward movement of the frontal inflatable cushion 420 when the frontal inflatable cushion 420 is in the deployed state. For example, upon engagement with, or being struck by, a vehicle occupant during a vehicle impact event, forward and/or upward movement of the frontal inflatable cushion 420 can be limited, at least in part, due to the coupling of the first inflatable cushion 420 to the side inflatable cushion 440 and/or the second side inflatable cushion.

Figure 9B:
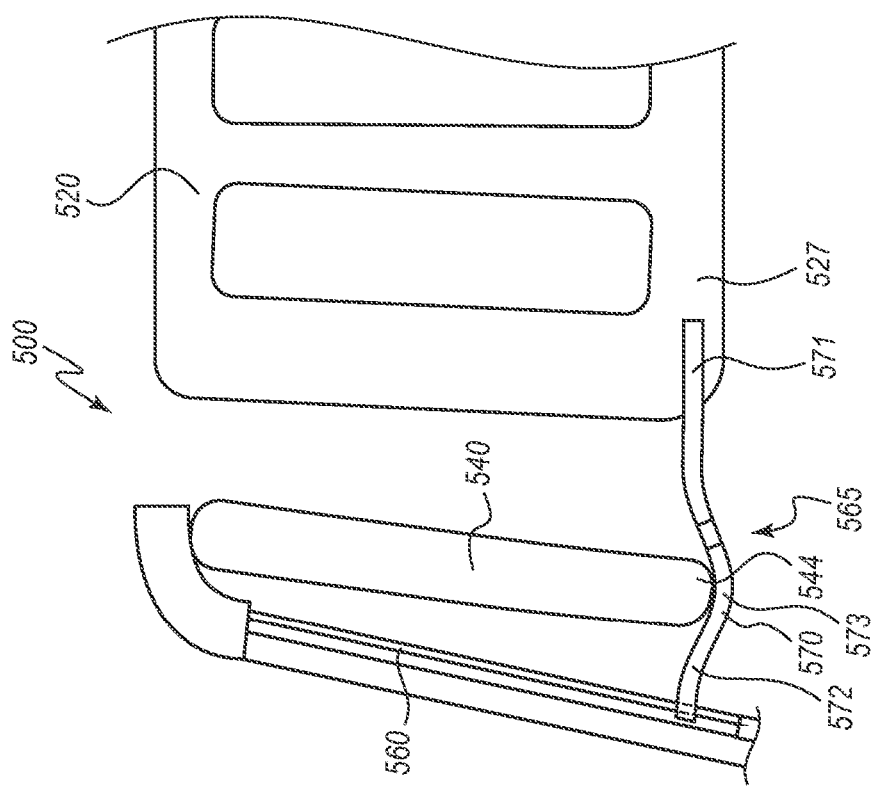
FIG. 9B is a front view of the tether system of FIG. 9A in a deployed state.
Figure 9A:
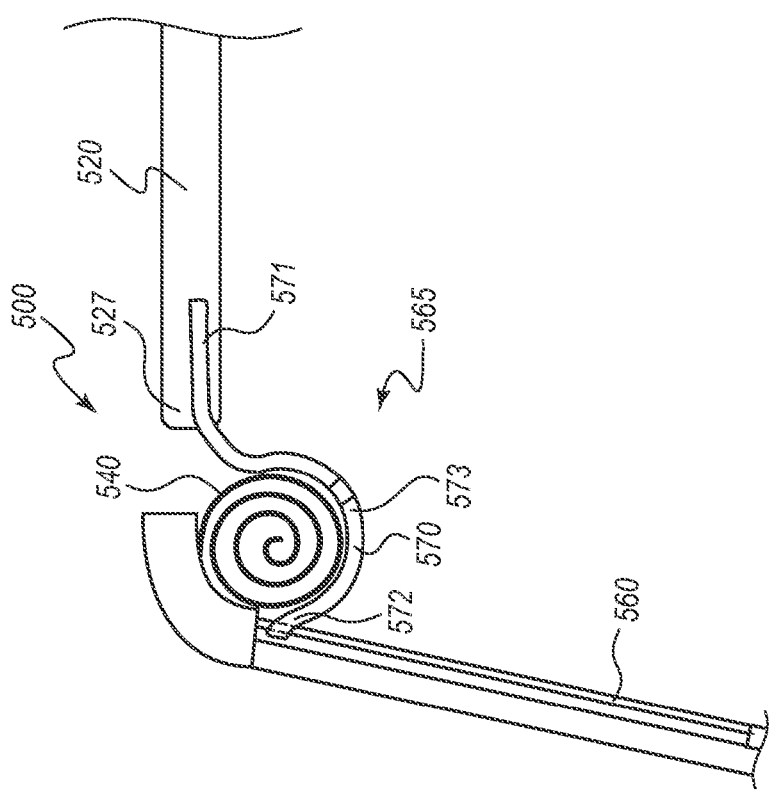
FIG. 9A is a front view of a tether system according to another embodiment of the present disclosure, in a packaged state within a vehicle

FIG. 9A is a front view of a tether system 565 of an airbag assembly 500 according to yet another embodiment of the present disclosure, in a packaged state within a vehicle. FIG. 9B is a front view of the tether system 565 of FIG. 9A in a deployed state. As illustrated, the tether system 565 comprises a tether 570. A first end portion 571 of the tether 570 is coupled to a frontal inflatable cushion 520 at a first lower corner portion 527 of the frontal inflatable cushion 520. As discussed above in reference to the tether systems 265, 365, 465, in some embodiments, the first end portion 571 of the tether 570 may be coupled to a different portion of the frontal inflatable cushion 520. The tether 570 further comprises a second end portion 572. The second end portion 572 is coupled to a sliding rail assembly 560, as discussed above. In some embodiments, the sliding rail assembly 560 may be disposed adjacent a B-pillar of the vehicle. In certain embodiments, the sliding rail assembly may be disposed at another position within the vehicle (i.e., adjacent the A-pillar or the C-pillar).

FIGS. 9A and 9B are partial frontal views of the airbag assembly 500. In various embodiments, the airbag assembly 500 may further comprise a second tether system analogous to the tether system 565, wherein the second tether system is coupled to each of a second lateral edge of the frontal inflatable cushion 520 and a second sliding rail assembly that is disposed at an opposite side of the passenger compartment of the vehicle in relation to the sliding rail assembly 560.

With reference to FIG. 9A, in the packaged state, at least a portion of the side inflatable cushion 540 is rolled or packaged. Upon deployment of the airbag assembly 500, the side inflatable cushion 540 may be unrolled or unpackaged. Further, upon deployment of the frontal inflatable cushion 520, the second end portion 572 of the tether 570 may be displaced or moved downward along the sliding rail assembly 560. As illustrated in FIG. 9B, in the deployed state, the tether 570 may extend from a portion of the sliding rail assembly 560 to a position at or adjacent a first lower corner portion 527 of the frontal inflatable cushion 520. Further, at least a portion of the tether 570 (i.e., a mid-portion 573 of the tether 570) may be coupled to or disposed adjacent a lower edge 544 of the side inflatable cushion 540.

In some embodiments, the coupling of the frontal inflatable cushion 520 to the side inflatable cushion 540, the second side inflatable cushion, and/or the one or more sliding rail assemblies may be configured to limit forward and/or upward movement of the frontal inflatable cushion 520 when the frontal inflatable cushion 520 is in the deployed state. For example, upon engagement with, or being struck by, a vehicle occupant during a vehicle impact event, forward and/or upward movement of the frontal inflatable cushion 520 can be limited, at least in part, due to the coupling of the first inflatable cushion 520 to the side inflatable cushion 540, the second side inflatable cushion, and/or the one or more sliding rail assemblies.

Much of the foregoing disclosure has focused on frontal curtain airbags configured to deploy in front of a driver and/or a passenger seated in a front seat of a vehicle. It should be understood that airbag features disclosed herein may be used with other types of airbags, as previously mentioned. For example, in some embodiments, frontal curtain airbags configured to deploy in front of one or more passengers in a rear bench or seat of a vehicle can include airbags (e.g., a frontal inflatable cushion and side inflatable cushions) such as disclosed herein.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. An airbag assembly, comprising:
  a housing assembly configured to be mounted in a roof of a vehicle;
  a frontal inflatable cushion defining an inflatable chamber that is configured to receive inflation gas from an inflator assembly disposed within the housing assembly to expand the frontal inflatable cushion from a packaged state to a deployed state, wherein the frontal inflatable cushion is configured to deploy from the housing assembly, and wherein the frontal inflatable cushion is configured to deploy in both a downward direction and a rearward direction relative to the housing assembly; and
  a first tether having a first end portion, a mid-portion, and a second end portion, wherein the first end portion is coupled to the frontal inflatable curtain, and wherein the first tether is configured to extend along an outside surface of a side inflatable cushion such that the mid-portion of the first tether is configured to be coupled to the side inflatable cushion and the second end portion of the first tether is configured to be coupled to the vehicle and such that the side inflatable cushion and the vehicle support the frontal inflatable cushion when the frontal inflatable cushion is in the deployed state.

2. The airbag assembly of claim 1, wherein the frontal inflatable cushion deploys from a frontal portion of the housing assembly, and wherein the frontal portion of the housing assembly is configured to be mounted in the roof of the vehicle at a position forward relative to a vehicle occupant position, and
  wherein the side inflatable cushion deploys from a side portion of the housing assembly, and wherein the side portion of the housing assembly is configured to be mounted at a position in the roof of the vehicle at a position lateral relative to the vehicle occupant position.

3. The airbag assembly of claim 1, wherein the frontal inflatable cushion comprises a corner portion at a junction of a lateral edge and a distal edge of the frontal inflatable cushion, and wherein the first end portion of the first tether is coupled to the frontal inflatable cushion at the corner portion.

4. The airbag assembly of claim 1, wherein a rearward edge of the side inflatable cushion is coupled to the vehicle.

5. The airbag assembly of claim 1, wherein deployment of the frontal inflatable cushion comprises a first stage and a second stage, wherein the first stage comprises a deployment of the frontal inflatable cushion in a substantially vertical downward direction, and wherein the second stage comprises a deployment of the frontal inflatable cushion in a substantially downward and rearward direction.

6. The airbag assembly of claim 1, wherein the frontal portion of the housing assembly is configured to be mounted in a head liner of the vehicle.

7. An airbag assembly, comprising:
a housing assembly to be mounted at a roof of a passenger compartment of a vehicle;
an inflator assembly;
a frontal inflatable cushion that defines an inflatable chamber that is configured to receive inflation gas from the inflator assembly to expand the frontal inflatable cushion from a packaged state within the housing assembly to a deployed state, wherein the frontal inflatable cushion is configured to deploy from the housing assembly to receive a head and at least a portion of a torso of a vehicle occupant moving from a vehicle occupant position primarily in a forward direction relative to the vehicle during a vehicle impact event; and
a first tether including a first end portion, a mid-portion, and a second end portion, wherein the first end portion of the first tether is stitchingly coupled to a first lower corner portion of the frontal inflatable cushion, and wherein the first tether is configured to extend along an outside surface of a first side inflatable curtain airbag disposed at a first side of the passenger compartment of the vehicle such that the mid-portion of the first tether is configured to be coupled to the first side inflatable curtain airbag and the second end portion of the first tether is configured to be coupled to the vehicle such that when the frontal inflatable cushion is in the deployed state the first side inflatable curtain airbag and the vehicle provide support to a lower edge of the frontal inflatable cushion in a rearward direction relative to the vehicle to enable the frontal inflatable cushion to restrain movement of the vehicle occupant in the forward direction during the vehicle impact event.

8. The airbag assembly of claim 7, wherein a front surface of the frontal inflatable cushion in the deployed state is disposed a distance from occupant interfacing surfaces in the passenger compartment of the vehicle.

9. The airbag assembly of claim 7, further comprising:
a second tether including a first end portion and a second end portion, wherein the first end portion of the second tether is stitchingly coupled to a second lower corner portion of the frontal inflatable cushion and the second end portion of the second tether is configured to be coupled to the vehicle at a second side of the passenger compartment of the vehicle, wherein the second side of the passenger compartment of the vehicle is opposite the first side of the passenger compartment of the vehicle.

10. The airbag assembly of claim 7, wherein the frontal inflatable cushion is configured to receive a head and at least a portion of a torso of a passenger of the vehicle and to receive a head and at least a portion of a torso of a driver of the vehicle.

11. The airbag assembly of claim 7, wherein the frontal inflatable cushion deploys toward a lap of a vehicle occupant.

12. The airbag assembly of claim 7, wherein the inflatable chamber of the frontal inflatable cushion is substantially W shaped.

13. The airbag assembly of claim 7, wherein the vehicle lacks a knee bolster.

14. A frontal airbag assembly, comprising:
an inflator;
an inflatable cushion coupled to the inflator and configured to be deployed from within a housing mountable within a roof of a vehicle, the inflatable cushion comprising a front face and a rear face that cooperate to form a void for receiving an inflation gas from the inflator and that define a first lateral edge, a second lateral edge, and a distal edge;
a first tether having a first end portion, a mid-portion, and a second end portion, wherein the first tether is elongate, the first end portion of the first tether coupled by a coupling mechanism to the first lateral edge, and wherein the first tether is configured to extend along an outside surface of a first side curtain airbag such that the mid-portion of the first tether is configured to be coupled to the first side curtain airbag and the second end portion of the first tether is configured to be coupled by a coupling mechanism to the vehicle such that the first side curtain airbag and the vehicle support the inflatable cushion when the inflatable cushion is in a deployed configuration; and
a second tether having a first end portion, a mid-portion, and a second end portion, wherein the second tether is elongate, the first end portion of the second tether coupled by a coupling mechanism to the second lateral edge, and wherein the second tether is configured to extend along an outside surface of a second side curtain airbag such that the mid-portion of the second tether is configured to be coupled to the second side curtain airbag and the second end portion of the second tether is configured to be coupled by a coupling mechanism to the vehicle such that the second side curtain airbag and the vehicle support the inflatable cushion when the inflatable cushion is in the deployed configuration,
wherein upon reception of the inflation gas within the void, the inflatable cushion transitions from a packaged configuration within the housing to the deployed configuration, wherein the inflatable cushion is configured to initially deploy downward in a substantially vertical direction relative to the housing, and wherein the inflatable cushion is configured to subsequently deploy both downward and rearward relative to the housing.

15. The frontal airbag assembly of claim 14, wherein a proximal edge of the inflatable cushion is coupled to the vehicle via the housing, wherein the first side curtain airbag is coupled to the vehicle, and wherein the second side curtain airbag is coupled to the vehicle.

16. The frontal airbag assembly of claim 14, wherein the void of the inflatable cushion is substantially W shaped, and wherein non-inflatable portions are disposed between inflatable portions of the W-shaped void of the inflatable cushion.

17. The frontal airbag assembly of claim 16, wherein at least one of the non-inflatable portions is configured to receive at least a portion of a head and at least a portion of a torso of a vehicle occupant when the vehicle occupant moves from a vehicle occupant position primarily in a forward direction relative to the vehicle.

* * * * *